United States Patent [19]

Houtman

[11] 4,107,583
[45] Aug. 15, 1978

[54] DYNAMOELECTRIC MACHINE WINDING ARRANGEMENTS, DYNAMOELECTRIC MACHINES INCORPORATING SAME AND METHODS OF OPERATING SUCH DYNAMOELECTRIC MACHINES

[75] Inventor: Jack A. Houtman, Holland, Mich.

[73] Assignee: General Electric Company, Fort Wayne, Ind.

[21] Appl. No.: 785,512

[22] Filed: Apr. 7, 1977

[51] Int. Cl.² .............................................. H02P 1/44
[52] U.S. Cl. ............................ 318/221 D; 318/221 G; 318/225 R
[58] Field of Search .......... 318/220 R, 221 R, 221 D, 318/221 E, 221 G, 225 R

[56] References Cited

U.S. PATENT DOCUMENTS

| 1,726,230 | 8/1929 | Kennedy | 318/221 D |
| 1,780,881 | 11/1930 | Kennedy | 318/225 R |
| 2,094,512 | 9/1937 | Whitby | 318/221 D |

FOREIGN PATENT DOCUMENTS 405,105  2/1934  United Kingdom ................ 318/221 D

*Primary Examiner*—Gene Z. Rubinson
*Attorney, Agent, or Firm*—Ralph E. Krisher, Jr.; A. Burgess Lowe

[57] ABSTRACT

A motor particularly designed and adapted for starting as a high resistance auxiliary winding, low "a" ratio resistance split phase motor and for operating continuously thereafter as low resistance auxiliary winding, high "a" ratio capacitor motor. The motor has a primary winding phase with a number of effective winding turns $n_{le}$; a first auxiliary winding section with a number of effective winding turns $n_{lesr}$ for having a first positive magnetic effect; and a second section of an auxiliary winding phase having a number of effective winding turns for having a negative magnetic effect; and wherein the first and second sections, when energized at the same time, have a second preselected number of effective winding turns $n_{less}$ which is less than $n_{lesr}$. The ratio of $n_{less}$ to $n_{le}$ (defined as "$a_s$") is in a first range; and the ratio of $n_{lesr}$ to $n_{le}$ (defined as "$a_r$") is in a second range. These ranges are chosen to provide good capacitor motor running performance; and to provide good starting and accelerating performance as a resistance split phase motor. During starting conditions, the main winding current is influenced by the ratio "$a_s$" and its current characteristic causes proper relay operation. The relay opens its contacts at a main winding current condition corresponding to a chosen motor speed. The auxiliary winding is interrelated with the relay contacts so that, during starting conditions, two auxiliary winding sections are energized; but only a first auxiliary winding section is energized after the relay contacts open. In preferred applications, both sections of the auxiliary winding phase are energized during starting conditions and the total auxiliary winding phase presents a relatively high resistance load to the power source while the second section of the auxiliary winding phase shunts a capacitor. When the second section of the auxiliary winding phase is de-energized, the relatively lower resistance first section of the auxiliary winding phase continues to be energized—but through the capacitor. In this mode, efficient running performance usually associated with capacitor motors is attained. The first and second sections of the auxiliary winding phase may be made of the same winding material and may be of the same size (i.e., diameter). Alternatively, higher resistance per turn materials—for example, such as smaller diameter copper, or other materials may be used for the second winding section.

17 Claims, 3 Drawing Figures

DYNAMOELECTRIC MACHINE WINDING ARRANGEMENTS, DYNAMOELECTRIC MACHINES INCORPORATING SAME AND METHODS OF OPERATING SUCH DYNAMOELECTRIC MACHINES

BACKGROUND OF THE INVENTION

The present invention relates generally to dynamoelectric machines, and winding arrangements and methods of operating the same. More particularly, the invention is of particular value in connection with applications wherein dynamoelectric machines are hermetically sealed within a refrigeration system.

Induction motors used in refrigerator and freezer applications are usually of the induction run variety, and the start or auxiliary winding is de-energized during the running condition. Such motors are normally connected with a current relay coil in series with the main winding. The current relay senses the main winding current and then is operative to open or disconnect the start winding circuit as the motor approaches running speed. Start winding designs of this particular type of induction motor for hermetic applications usually include additional resistance in the form of backward-wound turns to improve the starting, accelerating, and relay characteristics of the motor.

More recently, it has been found to be advantageous in at least some applications to utilize the teachings of Johnson U.S. Pat. No. 3,774,062, which issued on Nov. 20, 1973 in order to reduce, if not eliminate, the use of backward-wound turns. The entire disclosure of this Johnson patent is incorporated herein by reference for background purposes. Although persons of ordinary skill in the art are familiar with the usage of current relays for de-energizing the start windings of hermetic motors, one publication in the art which describes such arrangements in some detail and discusses the application of such relays in Smith et al. U.S. Pat. No. 3,633,057, which issued Jan. 4, 1972. The disclosure of this patent also is incorporated herein by reference.

Recently, in an effort to improve motor efficiencies, much development effort has been dedicated to the design of capacitor run motors for those applications in which resistance start, induction run motors have been used heretofore. These efforst have been aimed at providing motor designs which would result in substantially improved efficiencies compared to the induction run design. However, capacitor run designs inherently have relatively low starting torque. In fact, the starting torque for such motors is usually at such low levels that it generally is inadequate for many hermetically enclosed refrigeration applications. Because of this, capacitor run designs intended for such applications inevitably seem to require that an auxiliary starting aid must be utilized. One example of such efforts is the use of an external resistor in series with the start winding. Other examples are described in an application Ser. No. 778,335 assigned to the assignee of the present invention and filed Mar. 17, 1977 and filed in the name of William C. Rathje of Clinton, Iowa. For purposes of background information, the disclosure of the aforementioned Rathje application is incorporated herein by reference.

In some starting aid arrangements suggested heretofore, the external resistor is arranged in series relationship with relay contacts external to the hermetically enclosed motor stator. One desirable benefit with this type of an arrangement is that the resistor is not active during running conditions. Moreover, the resistor can serve to limit the discharge current through the relay contacts and thus may also provide improvements in relay reliability. Even with this approach, however, the motor would have to be designed so that the motor main current versus speed would be such that a usable "relay" current characteristic would be provided. One solution for this problem would be to utilize arrangements such as those shown in Martin U.S. Pat. No. 3,303,402, dated Feb. 7, 1967. However, it would be even more desirable to provide improved starting torque for a capacitor run motor without necessitating the use of any auxiliary external starting aid. The value of avoiding the use of external resistors or PTCRs is even greater when it is recalled that usually only finite and discreet values of such resistors or PTCRs are commercially available at a resonable cost. Because of this, the motor designer would have to comprise the optimization of his winding arrangements while accommodating such design to the discreet and finite value of a given resistor or PTCR.

It accordingly would be desirable to provide a new and improved hermetic motor which would operate as a capacitor run motor and yet which also would have improved starting torque characteristics without requiring the use of an extra resistor or PTCR. More specifically, it would be desirable to provide a new and improved motor of a type such that established and proven high-speed winding techniques may be utilized to provide an auxiliary winding particularly selected for capacitor run operation and yet also having virtually any desired internal resistance during the starting period. This type of approach would let a motor designer optimize the auxiliary winding for capacitor run operation and yet also optimize the winding for starting conditions and relay characteristics. It would be further desirable to provide a motor winding arrangement such that relatively high $I^2R$ losses generally associated with the auxiliary winding of a resistance split phase motor would not occur during running conditions. Finally, it would also be desirable to provide a motor winding arrangement wherein different types of winding materials may be utilized in order to minimize the cost of such an arrangement.

Accordingly, it is an object of the present invention to provide improved dynamoelectric machine winding arrangements for hermetically sealed applications whereby capacitor-run performance may be obtained and yet wherein adequate starting and accelerating torque may also be provided without requiring the use of external resistors or PTCRs, and yet wherein desired main winding current characteristics will also be established for proper current relay operation.

It is a more specific object of the present invention to provide a motor having a main winding phase and an auxiliary winding phase wherein the auxiliary winding phase includes multiple sections that may be selectively energized depending upon whether the motor is in a starting and accelerating mode or in a normal running mode, wherein desired running and starting performance is provided, and yet wherein normal duty relays may be reliably used to control the selective energization of such multiple sections.

It is yet another object of the present invention to provide improved motors and winding circuit arrangements therefor wherein, during starting conditions, the effective "a" ratio of the auxiliary and main windings is of a first relatively low value (and the resistance of the auxiliary winding phase is relatively high) so that a suitable relay current will flow through the main winding of the motor and so that relatively good starting torque will be provided; and wherein, during running conditions, the effective "a" ratio of the auxiliary and main windings is higher than it was during starting so that effective utilization of a run-capacitor will result, and the auxiliary winding resistance is relatively low (as compared to starting) so that improved running efficiencies may be attained.

It is a more specific object of the present invention to provide an arrangement of the type described in the immediately preceding paragraph wherein the auxiliary winding is devised so that at least part of this winding will act as a protective impedance for the contacts of a current relay.

It is still another object of the present invention to provide a resistance start-capacitor run motor wherein an auxiliary winding circuit is devised so that the motor designer will have one more degree of design freedom than has generally been recognized heretofore; all with the result that the resistance start motor may be designed having desirable features previously recognized for resistance start motors, and yet wherein such motor may also be design optimized for good capacitor-run running performance.

SUMMARY OF THE INVENTION

In carrying out the present invention in one form thereof, I provide a motor that is particularly designed and adapted for operation during starting conditions as a resistance split phase motor having a primary winding phase with a preselected number of effective winding turns $n_{le}$; a first section of an auxiliary winding phase for carrying current in a first instantaneous relative reference direction and having a first preselected number of effective winding turns $n_{lesr}$; and a second section of an auxiliary winding phase for carrying current in a second instantaneous relative direction opposite to the reference direction in the first section; and wherein the first and second sections of such auxiliary winding phase have, when energized at the same time, a second preselected number of effective winding turns $n_{less}$.

The number of effective winding turns of the auxiliary winding phase are selected so that the ratio of $n_{less}$ to $n_{le}$ (herein defined as "$a_s$") is in a first predetermined range; and so that the ratio of $n_{lesr}$ to $n_{le}$ (herein defined as "$a_r$") is in a second predetermined range. These predetermined ranges are selected so that during running conditions when the first section of the auxiliary winding phase remains energized with a capacitor connected in series therewith good running performance results; and so that during starting conditions when both sections of the auxiliary winding phase are energized good starting and accelerating performance (as compared to a permanent capacitor motor) will result. During starting conditions, the main winding current is influenced by the ratio "$a_s$" and the current characteristic is such that it will cause proper operation of a relay having its relay coil connected in series with the main winding. Thus, the relay is operable to open its contacts at a desired main winding current condition corresponding at least approximately to a predetermined motor speed.

The auxiliary winding is provided with connecting points that are interrelated with the relay contacts and a power supply line so that during starting conditions, both of the auxiliary winding sections are energized; but only the first winding section of the auxiliary winding is energized after the relay contacts open. At this time, the capacitor provides good running performance because the ratio "$a_r$" has been selected to be in a desirable range.

In preferred embodiments of the present invention, the ratio "$a_s$" is in the range of from about 0.7 to about 1.0; and the ratio "$a_r$" is in the range of from about 1.0 to about 1.7—in more preferred forms, "$a_r$" is from about 1.1 to 1.5. Furthermore, the numerical ratio of "$a_r$" to "$a_s$" is less than 2. When the ratio "$a_r$" is in the range just mentioned, improved motor operating efficiency will result with a capacitor connected in series with the first section of the auxiliary winding phase.

In applications utilizing the present invention in preferred forms thereof, a motor circuit is provided that utilizes motors particularly designed and constructed according to the invention and wherein a capacitor is connected between one side of the power supply and the electrical junction of the first and second sections of the auxiliary winding phase. During starting and accelerating conditions, the second section of the auxiliary winding phase is connected through closed relay contacts in parallel circuit relation with the capacitor. However, when the contacts open, the second section of the auxiliary winding phase is disconnected from the power supply, and power to the first section of the auxiliary winding phase is supplied only through the capacitor.

With this arrangement, the second section of the auxiliary winding phase provides a protective impedance for the relay contacts and prevents arcing and associated damage to the relay contacts. Accordingly, relatively slow acting, state of the art relays may be used.

In preferred applications, both sections of the auxiliary winding phase are energized during starting conditions and the total auxiliary winding phase presents a relatively high resistance load to the power source while the second section of the auxiliary winding phase shunts the capacitor. Thus, relatively good starting torque associated with resistance split phase motors is provided. Then, when the relay contacts drop out, the second section of the auxiliary winding phase is de-energized, and the relatively lower resistance first section of the auxiliary winding phase continues to be energized—but through the capacitor. In this mode, efficient running performance usually associated with capacitor motors is attained.

When carrying out the present invention, the first and second sections of the auxiliary winding phase may be made of the same winding material and may be of the same size (i.e., diameter). Alternatively, higher resistance per turn materials-for example, such as smaller diameter copper, or EC aluminum (of suitable diameter) or material having a particular characteristic ratio "R" (and also of suitable diameter) as described in the above-referenced Johnson U.S. Pat. No. 3,774,062 may be used for the second winding section. Preferably, relatively good conductor material, such as EC aluminum or copper will be utilized for the first section of the auxiliary winding phase. The ability to select different materials and/or sizes of winding material for the two winding sections gives the motor designer still further flexibility and freedom in designing a motor for a particular application-all as will now be understood by persons skilled in the motor art.

One of the preferred modes of establishing the first and second winding sections of the auxiliary phase winding is to arrange and energize the winding turns of the first section on a magnetic core so that they conduct current in a first instantaneous reference direction; and to arrange and connect the winding turns of the second section in such a manner that they would conduct (at the same instant in time) current in a sense opposite to the reference direction. Thus, the second winding section is in bucking relation with respect to the first winding section. The net result of this arrangement is that energization of the entire auxiliary winding results in less effective turns (i.e., $n_{less}$) than the effective turns $n_{lesr}$ which result when only the first section is energized. Moreover, this results in a relatively high resistance winding with a low number of effective turns (which is analogous to what occurs with "blacklash" winding arrangements), while the auxiliary winding resistance is relatively low when the number of effective turns is "high".

As is known, the "a" ratio of a motor at any given time is a function of the relative number of effective turns in the auxiliary and main windings. In carrying out the present invention, a higher "a" ratio during running conditions is desirable for capacitor run operation, and a lower "a" ratio is desirable for resistance start and relay current characteristics.

With the arrangements taught herein, it is now possible for a motor designer to optimize his motor design by optimizing the capacitor voltage as a result of being able to design for a relatively high "a" ratio during running conditions. With prior approaches, attempts to do this would result in degrading the needed relay-main winding current characteristics. The backward or reverse turns in the second auxiliary winding section now permit the attainment of good relay-main winding current characteristics and, moreover, the reverse turns establish a protective impedence for the relay contacts.

The subject matter which I regard as my invention is set forth in the appended claims. The invention itself, however, together with further objects and advantages thereof may be better understood by referring to the following more detailed description taken in conjunction with the accompanying drawings.

DETAILED DESCRIPTION OF THE DRAWINGS

Figure 1:
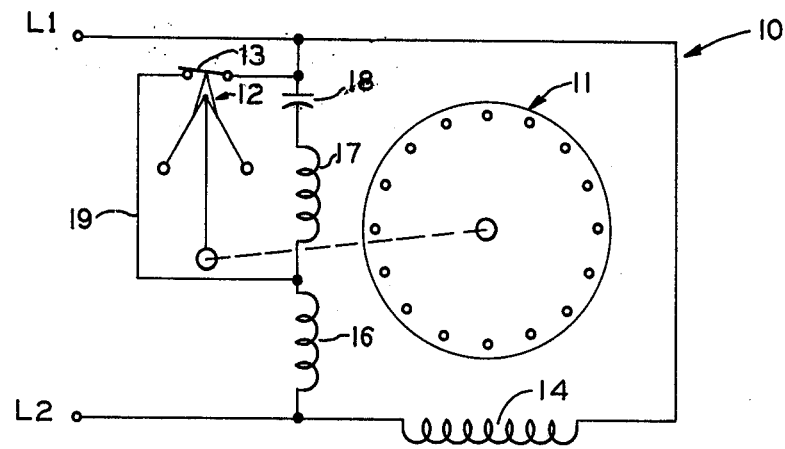
FIG. 1 is a simplified schematic diagram for one type of motor that has been known heretofore in the prior art; wherein an auxiliary winding is provided with two winding sections, and a centrifugal mechanism is utilized to selectively by-pass a capacitor and one of the auxiliary winding sections connected in series therewith.

Referring now to the drawings in more detail, and more particularly to FIG. 1, a motor 10 has been schematically illustrated which has been manufactured and sold by the assignee of the present invention long prior to the present invention. The motor 10 includes a conventional squirrel cage rotor 11 and a centrifugal switch mechanism 12 which opens a switch 13 as the rotor 11 approaches running speed. During starting conditions, the switch 13 is in the closed condition as shown in FIG. 1.

The motor 10 includes a main winding phase 14 of any desired number of poles and an auxiliary winding that includes a first winding section 16 and a second winding section 17. The winding section 17, along with a run capacitor 18, is short circuited by line 19 and the switch 13 under starting conditions. Thus, during starting conditions, the auxiliary winding section 16 alone is energized from lines L1 and L2. As the motor 10 approaches running speed, however, the switch 13 opens and winding sections 16 and 17 both then are connected in series with the capacitor 18 and across lines L1 and L2. The winding sections 16 and 17 are, as will be understood, disposed on a magnetic core in aiding relationship and thus both contribute to the development of positive torque during running conditions. During starting conditions, the "a" ratio of effective turns of the winding 16 to the main winding 14 would be on the order of about 0.7 to 0.9, and the resistance of the auxiliary winding 16 is relatively low. However, when the switch 13 opens, the combined or total resistance of windings 16 and 17 is anywhere from two to five times the resistance of the winding 16 when considered alone. Moreover, the "a" ratio of the auxiliary winding to main winding (with both windings 16 and 17 energized) typically is in the range of from about 2 to 2.5. Thus, the "a" ratio is changed (i.e., increased from starting to running conditions) by a factor of about 2 to 0.7 or about 2.8:1. The description of the prior art typified by FIG. 1 is presented herein for background purposes, but it is noted that other patents in the art have also discussed approaches where relays or centrifugal switches have been used for selectively energizing only part of an auxiliary winding during running conditions. These types of arrangements are shown for example in: Kingston U.S. Pat. No. 1,948,037 (Feb. 20, 1934); Lyden U.S. Pat. No. 2,028,230 (Jan. 21, 1936); and Kennedy U.S. Pat. No. 1,780,881 (Nov. 4, 1930), to name but a few.

Kennedy U.S. Pat. No. 1,780,881 also illustrates an arrangement where an extra auxiliary winding section is added to a basic auxiliary winding section only during starting conditions. In the Kennedy arrangement, however, a capacitor is always connected in circuit with the auxiliary winding regardless of whether all or only part of the auxiliary winding is being energized. Another patent—i.e., Bailey U.S. Pat. No. 1,707,424 (Apr. 2, 1929)—does discuss arrangements wherein an external resistance may be selectively switched into series circuit arrangement with all or part of an auxiliary winding. Bailey also teaches that the auxiliary winding may be energized through a capacitor when the external resistor is "switched out".

It now will be appreciated that many different approaches have been suggested heretofore for providing resistance split-phase induction start and capacitor run motors. However, utilizing such prior teachings would result in one or more of the problems or difficulties that have been discussed hereinabove.

Figure 2:
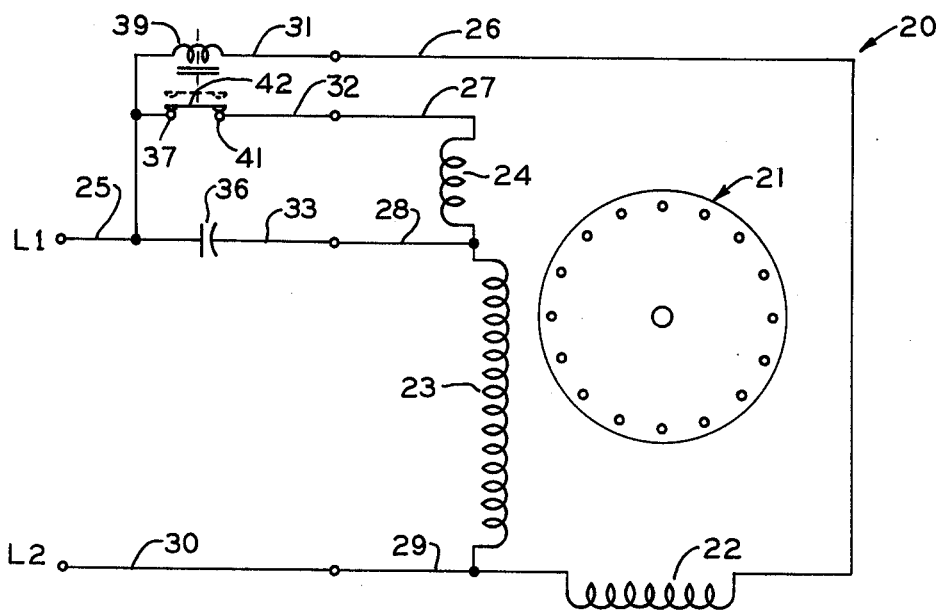
FIG. 2 is a simplified schematic diagram of a motor embodying the present invention in one preferred form thereof.

In FIG. 2, a motor 20 embodying the present invention in one form thereof is illustrated in schematic form. The motor 20 includes a conventional squirrel cage rotor 21, a primary or main winding 22, and an auxiliary winding which includes a first winding section 23 and a second winding section 24.

It will be noted that the schematic representation for the winding sections 23 and 24 shows that they are in the opposite "sense" because the instantaneous magnetic effect of winding section 24, when energized, is in bucking relationship to the instantaneous magnetic effect of winding section 23. It should be understood that the present invention may be applied to motors of any desired number of poles or multi-speed motors, and that such motors may be supplied with single phase power of any suitable voltage and frequency.

When stator assembly embodying the present invention are to be utilized in hermetically sealed refrigeration systems—for example in hermetically sealed compressors—the stator assembly and a rotor usually are transferred from one location to another where the stator assembly is assembled within a hermetically sealable container. The rotor (usually comprising a magnetic core with a die cast squirrel cage winding) normally is then assembled with a compressor shaft, crank, and so forth. Subsequently, the container is hermetically sealed. The stator assembly is energized by connections or leads that extend through a seal in the compressor housing which are interconnected with the four motor leads 26–29. In FIG. 2, the leads that are external are identified as leads 30, 31, 32 and 33. These leads may extend from the compressor to a location that is either closely proximate to the compressor or remote therefrom, and these leads in turn are interconnected with other components as will now be described with continued reference to FIG. 2.

Power lines L1 and L2 are connectable to lines 25 and 30 and, for simplicity of discussion, line 30 will be considered as a common line for a 110 volt application. Line 25 on the other hand is connected to one side of a capacitor 36, to one terminal 37 of a relay, and to one side of a relay coil 39. The other relay contact 41 is connected to line 32, and depending upon how much current is flowing through relay coil 39, relay arm 42 will be in a circuit making position (as shown), or in a circuit breaking position.

When power is initially supplied to the motor 20, the current supplied to the main winding 22 through relay coil 39 will be sufficiently great to close the relay contacts and power will then also be applied across lines 27 and 29, with current flowing serially through the auxiliary winding sections 24 and 23.

The total auxiliary winding comprising the sections 23 and 24, in conjunction with the main winding 22, causes the rotor 21 to rotate and accelerate, all as will be understood by persons skilled in the art.

Satisfactory starting and acceleration of rotor 21 is accomplished only when the second auxiliary winding section 24 is energized with section 23, and when capacitor 36 is shunted by winding section 24. As the rotor 21 accelerates and approaches a predetermined speed, (e.g., in the neighborhood of 3,000 rpm for a two pole, 60 Hz energized motor) the current through the main winding 22 decreases to a level such that the relay coil 39 "drops out" and opens contacts 37, 41. Thereafter, power is no longer supplied to lead 27 and the second auxiliary winding section 24 is de-energized.

As the relay contacts open, the second auxiliary winding section 24 acts as a protective impedance and prevents arcing across the contacts (and thus damage to the contacts) which otherwise would occur. After the relay drops out, the auxiliary winding 23 continues to be energized, but through capacitor 36 and lead 28.

Thereafter, the motor 20 operates as if it were a capacitor run motor, and its operation is characterized by desirable features, such as good efficiency, that normally are expected from capacitor run motors. It, of course, will be understood that during running conditions the main winding current is not of sufficient magnitude to cause reclosure of the relay contacts.

As has been mentioned hereinabove, since the motor 20 is used in conjunction with a current relay, the main winding current versus rotor speed must be such that the relay will pull in at standstill but drop out before running speed (e.g., about 3,450 rpm for a two-pole, 60 Hz motor) is reached. In order to provide the desired current characteristics in the main winding, it is necessary to hold a particular relationship between the auxiliary winding and main winding in terms of, among other things, the effective turns ratio for the windings. On the other hand, for capacitor run operation, it is generally desirable for the auxiliary winding to have a relatively low resistance (as compared to that of a resistance start-split phase motor) and also have an effective turns ratio vis-a-vis the main winding which is considerably different from that which would provide satisfactory relay operation.

The ratio of effective turns of an auxiliary winding to effective turns of a main winding is called the "$a$" ratio for the motor, but motors (or stator assemblies) embodying the present invention must have two distinctly different "$a$" ratios—a ratio "$a_s$" for resistance-split phase starting and accelerating conditions, and a ratio "$a_r$" for capacitor-run conditions.

My work to date has shown that the ratio "$a_s$" preferably should be in the range of from about 0.7 to about 1.0; and that the ratio "$a_r$" will most preferably be in the range of from about 1.0 to about 1.5.

The ratio "$a_s$" and "$Q_s$" ratio are both of concern vis-a-vis proper relay operation, where "$Q_s$" is defined as:

$$Q_s = \frac{r_s}{r_m(a_s)^2},$$

where "$r_s$" is the resistance of the start winding, "$r_m$" is the resistance of the main winding, and "$a_s$" is as defined hereinabove.

Generally speaking, for normal resistance-split phase hermetic motor applications and for satisfactory relay operation, $Q_s$ should have a value greater than 6, and "$a_s$" will be from about 0.7 to 0.9, although "$a_s$" may be as low as 0.55 for some applications. However, for these same types of applications where the motor is to be operated as a capacitor run motor, the running "$a$" ratio should generally or usually be from about 1.0 to about 1.7. Moreover, the auxiliary winding energized while "running" preferably will have relatively low resistance in order to improve efficiency of the motor. Motors embodying the invention, however, must still have resistances $r_s$ and $r_m$ such that a satisfactory "$Q_s$" ratio will result.

The present invention, as thus far generally described herein, teaches a way of resolving the conflicting requirements for resistance-start motors as compared to capacitor run motors, and one specific reduction to practice of the invention will now be described in more detail. In this description, the same reference numerals used in connection with FIG. 2 will be used in order to avoid confusion.

In one particular reduction to practice, the main winding 22 had a number of effective winding turns "$n_{le}$" of 106.10 (on a per pole or per coil group basis) and a resistance "$r_m$" of 1.4 ohms when the two coil groups of the two pole main winding were connected in parallel. The auxiliary winding section 23, on the other hand, had a total resistance of 6.85 ohms when the two poles thereof were connected in series and the (per pole or per coil group) number of effective turns of the auxiliary winding section 23 (i.e., $n_{lesr}$) was 130.1. The second section 24 of the auxiliary winding had a total resistance, when the two poles or coil groups thereof were connected in series with each other (and also in series with the auxiliary winding section 23) of 2.78 ohms. The number of effective winding turns (on a per pole or per coil group basis) of the winding section 23, was 52.81 in a negative sense because they have a negative magnetic effect as compared to section 24. When the winding sections 23 and 24 were both energized, the net or resultant number ($n_{less}$) of effective winding turns for the auxiliary winding was 77.29 (i.e., 130.1 minus 52.81), and the total resistance ($r_s$) was 9.63 ohms. Thus, "$a_s$" equaled 77.29/106.10, or 0.728; and "$a_r$" equaled 130.1/106.10, or 1.226.

Figure 3:
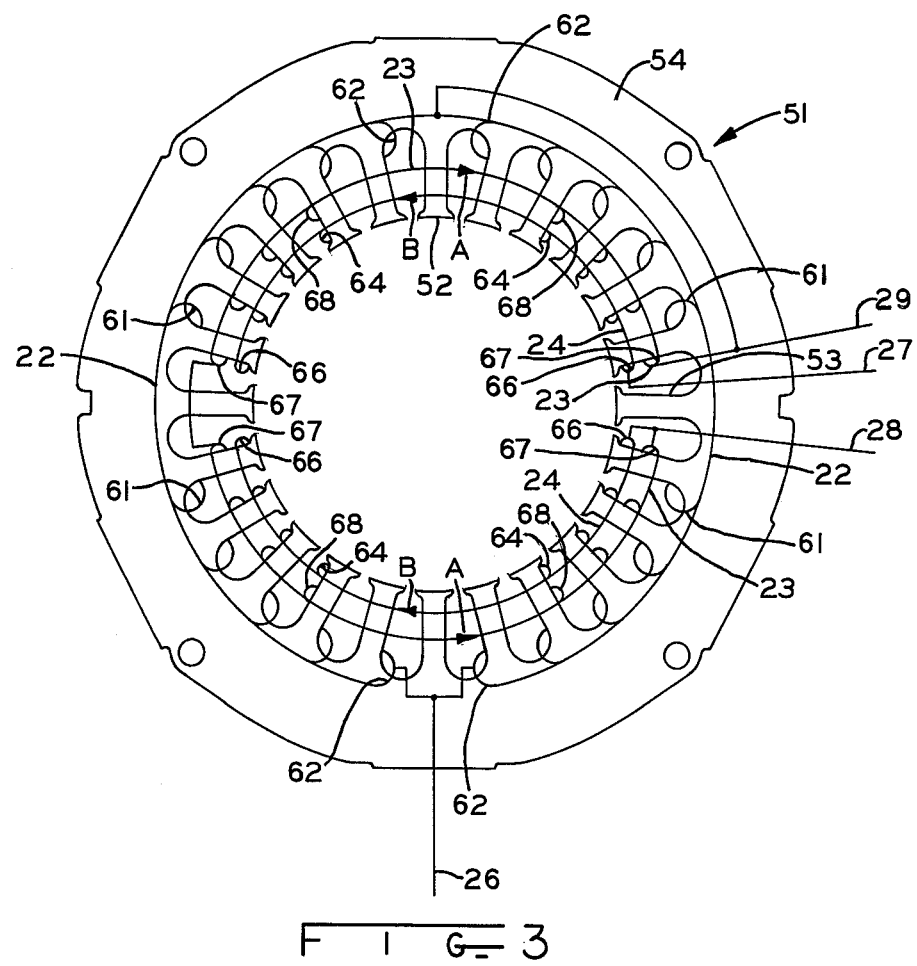
FIG. 3 is a schematic representation of a stator assembly embodying the invention in one specific form and wherein windings are disposed on a magnetic core.

With reference now to FIG. 3, the constructional details of this particular reduction to practice will be discussed in even more detail with reference to the stator assembly 51.

The stator assembly comprises, or course, a slotted magnetic core having a bore extending through the center thereof, with the bore being defined by the tips 52 of a plurality of teeth 53. These teeth, in turn, established therebetween axially extending slots which accommodated the turns of the main and auxiliary windings.

The magnetic core 54 was made up of a plurality of common iron laminations as known in the art, and a sufficient number of these laminations were stacked together to establish a core having a stack height or length of about 1.75 inches. The rotor (not shown in FIG. 3) had a shaft receiving bore of about three-quarters of an inch, the squirrel cage rotor bars were skewed at a nominal angle of about 15.5°, and the air gap between the rotor outer diameter and the bore of the stator assembly was about 0.0115 inches.

FIG. 3 is a full size representation of the core 51, and it will be noted from reviewing FIG. 3, that the core included 24 uniformly, angularly spaced apart slots of uniform size and shape. However, it will be understood, that the present invention may be practiced with cores having a number of slots other than 24 and/or wherein different slots may be of different sizes or shapes. The main winding 22 was formed with two coil groups disposed on the core to establish two primary or main poles; the winding sections 23, 24 of the auxiliary winding were also each formed with two coil groups as a two pole winding; and the motor utilizing the stator assembly 51 had a rated speed of 3,450 rpm when energized from a 60 Hz, 115 volt single phase source.

The particular winding distribution and winding materials utilized to produce a one quarter horsepower version of the motor 20 will now be presented. With regard first to the main winding 22, it will be noted that each coil group thereof comprises five coils. The number of turns in each of these coil groups, commencing from the innermost coil 61 to the outermost coil 62 was 39, 47, 52, 66, and 67 winding turns respectively, and on a "per pole" basis, the number of effective turns in each main winding coil group ($n_{le}$) was 106.10. The wire used to make the main winding 22 was 0.0320 inch diameter copper wire, with a total weight of 1.711 pounds of copper being used for the main winding.

With regard to the auxiliary winding, a total of 0.585 pounds of 0.0213 inch diameter copper wire was used in making the auxiliary winding sections 23, 24. When the same diameter is used to make the sections 23 and 24, all of the turns for a given slot could be wound continuously and taps then brought out and interconnected to establish the sections 23 and 24 in bucking relationship. However, this would be very inconvenient. Accordingly, it is preferred that the winding sections 23 and 24 be wound separately and then placed on the core (either concurrently or sequentially) with modern coil placing equipment. In the event that wire of different diameters or wire of different materials (as discussed hereinabove) is used for each of the auxiliary winding sections 23 and 24, it will be obvious that the sections must be wound as separate and distinct coil groups.

With continued reference to FIG. 3, the two-pole auxiliary winding section 24 is formed of two coil groups, with each coil group having four distributed and concentric coils. These coils have a distributed number of turns, from innermost coil 64 to outermost coil 66, of 19, 24, 24, and 78 turns respectively, and the number of effective turns ($n_{lesr}$) for the auxiliary winding section 24 was 130.1. These turns would carry current in an instantaneous reference direction as indicated by the arrows B. The auxiliary winding section 23, on the other hand, is wound and/or connected to carry current in an instantaneous direction relative to the reference direction as represented by the arrow "A".

The two-pole auxiliary winding section 23, like section 24, is established by two groups of concentric and distributed coils. The effective number of turns of each coil group for the auxiliary winding section 23 is −52.81, i.e., 52.81 in a negative sense relative to the sense of winding section 24. The actual number of turns for each coil, commencing at each outermost coil 67 and continuing to an innermost coil 68, was: 24, 13, 13, and 11 turns respectively.

The series connected resistance of all of the coils in the auxiliary winding section 23 was (as noted hereinabove) 6.85 ohms, the series connected resistance of all of the winding turns of the auxiliary winding section 24 was (as noted hereinabove) 2.78 ohms, and the total series resistance of all 206 turns of the auxiliary winding sections 23 and 24 was 9.63 ohms.

It should now be understood that the "$a$" ratio for the stator assembly 51 is the ratio of the number of effective turns of the auxiliary winding (or part thereof) being energized at a particular time with reference to the number of effective turns of the main winding being energized at the same time. Thus, for stator assembly 51 the ratio "$a_s$" is 0.728 during starting conditions, and the ratio "$a_r$" is 1.226 during running conditions.

Substantial improvements in performance (as compared to conventional resistance-split phase motors) were observed when the stator assembly 51 was interconnected with a 15 microfarad capacitor 36 and energized from a 60 Hz, single phase, 115 volt power source. Tests revealed that a motor which included stator assembly 51 had a rated running speed of 3,450 rpm, was rated as a one quarter horsepower motor, and drew 34.4 amperes with an 82.4 power factor under locked rotor conditions. The voltage on capacitor 36 was 177 volts at a full load torque point of about 6 ounce feet, and the voltage across capacitor 36 was 27 volts at standstill. The minimum locked rotor torque of this motor was 9.7 ounce feet, with the average locked rotor torque being 10.8 ounce feet. Maximum running torque was 28.8 ounce feet, the full load efficiency was 79.4%, full load power factor was 82.8, and full load current was 2.535 amperes.

For purposes of comparison with the data just given, a conventional high volume one quarter horsepower resistance split phase motor with a rated speed of 3,450 rpm (wherein the auxiliary winding was completely de-energized during running conditions) had a full load efficiency of only 70.9% with a full load torque of about 6 ounce feet. This comparison motor had a minimum locked rotor torque of 10.1 ounce feet, average locked rotor torque of 10.8 ounce feet, and locked rotor current was 36.1 amperes at a power factor of 84.2. However, under full load conditions, this motor had a power factor of 55.9, and drew 4.2 amperes. This comparison motor had an "$a$" ratio of 0.715 during starting and accelerating conditions, but also utilized only 0.813 pounds of aluminum as a main winding and 0.112 pounds of copper as a starting auxiliary winding.

In addition to the comparison motor just discussed, the performance of a permanent capacitor motor having a PTCR connected across the capacitor was reviewed. What is believed to be the most significant comparitive data for these motors is reproduced in Table I hereinbelow, wherein the data for the above-discussed "comparison" motor is listed in the column identified as "KH"; the data for the permanent capacitor motor with a PTCR across the capacitor is in the column headed "KCP/PTCR"; and the data for the motor utilizing stator assembly 51 is listed in the column headed "4-lead". All of the data in Table I is based on single phase, 60 Hz, 115 volt operation.

TABLE I

|  | KH | KCP/PTCR | 4-LEAD |
|---|---|---|---|
| Stack height, inches | 1.75 | 1.75 | 1.75 |
| Main winding material | Alum. | Cu. | Cu. |
| Main winding dia., inches | .0403 | .0320 | .0320 |
| Aux. winding material | Cu. | Cu. | Cu. |
| Aux. winding dia., inches | .0150 | .0239 | .0213 |
| Main wndg. resist., Ω | 1.37 | 1.38 | 1.40 |
| Aux. wndg. total resist., Ω | 7.38 | 4.41 | 9.63 |
| Start assistance | — | 5ΩPTCR | — |
| 3,000 rpm MRT, oz.-ft. | 28.3 | 28.2 | 28.8 |
| LRT, oz.-ft. | 10.8 | 13.7 | 10.8 |
| LRA, amperes | 36.1 | 34.5 | 34.4 |
| Capacitor volts at full load | — | 153 | 177 |
| *Efficiency, % | 70.9 | 78.6 | 79.4 |
| *P.F. | 55.1 | 74.4 | 82.8 |
| *Line current, amperes | 4.2 | 2.8 | 2.5 |

*Efficiency, P.F., and line current at ¼ horsepower rating point corresponding to 6.1 oz.-ft. torque After reviewing the data presented in Table I, it will be appreciated that the "4-lead" motor embodying the invention performed very favorably as compared to the other two motors. For example, the "4-lead" motor had more maximum running torque (MRT), better efficiency, and a better power factor (P.F.); and yet drew less line current at its rating point than either of the other two motors identified in Table I—and yet all of this was accomplished without an external starting aid or a heavy duty relay. It also should be noted that the starting assistance device provided for the "KCP/PTCR" motor, even though needed to provide acceptable starting performance, results in reducing operating efficiency since it continues to be in the circuit and dissipate energy even when in its high resistance state. Accordingly, it will be appreciated that this is yet another reason why the use of PTCR starting assistance devices would be less than fully desirable.

As a final point of information, it is noted that "effective" turns are discussed hereinabove. As used herein, "effective" turns or terms such as $n_{le}$, $n_{less}$, etc., are meant to have the same or consistent meanings as corresponding terms that are used and defined in my earlier U.S. Pat. No. 3,515,919 which issued June 2, 1970.

While the present application shows and describes what, at the present time, are considered to be preferred embodiments of the present invention in accordance with the Patent Statutes, changes may be made therein without actually departing from the true spirit and scope of the invention. For example, although the invention has been specifically illustrated and described in connection with 60 Hz, 115 volt, two-pole motors, it will be understood by those skilled in the art that the invention itself and benefits to be derived therefrom are not so limited. Moreover, although a specific motor described herein was made to embody the invention while utilizing all copper winding material, different winding materials may be selected and winding materials of different sizes may be utilized within the auxiliary winding; and in fact it would be expected that even more benefits would result from such an approach. Accordingly, it is intended that the following claims cover all equivalent variations that fall within the invention as defined by the claims.

What I claim as new and desire to secure by Letters Patent of the United States is:

1. In a stator assembly for an induction motor including a magnetic core having regions for accommodating winding turns; a primary phase winding having a number of effective turns $n_{le}$ thereof accommodated by the magnetic core; and an auxiliary phase winding having a first section having a number of effective turns $n_{lesr}$ and particularly adapted for energization during both starting and running conditions, and having a second section particularly adapted for energization only during starting conditions, the improvement comprising: said second section having a preselected number of negative effective winding turns arranged and interconnected to be in bucking relation to said first section whereby the number of effective turns $n_{lesr}$ reduced by said preselected number of negative effective winding turns is equal to a net number of effective turns $n_{less}$; the ratio of $n_{less}$ to $n_{le}$ is defined as $a_s$; the ratio of $n_{lesr}$ to $n_{le}$ is defined as $a_r$; and the number $a_r$ is greater than the number $a_s$; whereby the stator assembly may be operated in a resistance start motor having satisfactory starting relay characteristics and also having satisfactory characteristics as a capacitor run motor.

2. The invention of claim 1 wherein the ratio of $a_r$ to $a_s$ is not more than about two to one.

3. The invention of claim 1 wherein $a_r$ is in the range from about 1.0 to about 1.5.

4. The invention of claim 1 wherein $a_s$ is in the range from about 0.7 to about 1.0.

5. The invention of claim 1 wherein $a_r$ is in the range from about 1.0 to about 1.5, and $a_s$ is in the range from about 0.7 to about 1.0.

6. The invention of claim 1 wherein the primary phase winding is characterized by a resistance $r_m$, the first and second winding sections have a resistance $r_s$ when interconnected for starting conditions, and wherein the quantity $$\frac{r_s}{r_m(a_s)^2}$$

is not less than 6.

7. The invention of claim 1 wherein the first section has first and second leads extending therefrom, the second section is interconnected with the first section and has at least one other lead extending therefrom, and wherein the series resistance of the first and second sections is greater than the resistance of the first section as measured across the first and second leads.

8. The invention of claim 1 wherein the first section comprises wire having a first resistance per unit length, the second section comprises wire having a second resistance per unit length, and wherein the second resistance per unit length is greater than the first resistance unit length.

9. The invention of claim 8 wherein the wire of the first section and the wire of the second section are both made from the same material.

10. The invention of claim 8 wherein the wire of the first section is made from a first material and the wire of the second section is made of a material different than the first material.

11. A resistance start, capacitor run induction motor having a magnetic core for accommodating winding turns; a main winding having a number of effective turns $n_{le}$ accommodated by the magnetic core; and an auxiliary phase winding accommodated on the core; said auxiliary phase winding having a first winding section comprising a number of effective turns $n_{lesr}$ and particularly adapted for energization during both starting and continuous running conditions, and said auxiliary phase winding also having a second section particularly adapted for energization only during starting and accelerating conditions; said second section having a preselected number of negative effective winding turns arranged and interconnected to be in bucking relation to the effective winding turns of said first section whereby the number of effective turns $n_{lesr}$ reduced by said preselected number of negative effective winding turns is equal to a net number of effective turns $n_{less}$; the ratio of $n_{less}$ to $n_{le}$ is defined as $a_s$; the ratio of $n_{lesr}$ to $n_{le}$ is defined as $a_r$; wherein the resistance of the first and second sections combined is greater than the resistance of the first section alone; wherein the ratio $a_s$ is preselected so that a predetermined main winding current characteristic will be established whereby a current relay sensitive to the main winding current may be utilized for selectively energizing and de-energizing said second section; and wherein the ratio $a_r$ is preselected so that a capacitor may be advantageously utilized in series with said first section during continuous running conditions.

12. The invention of claim 11 wherein the number $a_r$ is greater than the number $a_s$ and wherein the ratio of $a_r$ to $a_s$ is not more than about two to one.

13. The invention of claim 11 wherein $a_r$ is in the range from about 1.0 to about 1.5, and $a_s$ is in the range from about 0.7 to about 1.0.

14. The invention of claim 11 wherein the main winding is characterized by a resistance $r_m$, the first and second winding sections have a resistance $r_s$ when interconnected for starting conditions, and wherein the quantity $$\frac{r_s}{r_m(a_s)^2}$$

is not less than 6.

15. The invention of claim 11 wherein the first section comprises wire having a first resistance per unit length, the second section comprises wire having a second resistance per unit length, and wherein the second resistance per unit length is greater than the first resistance per unit length.

16. The invention of claim 15 wherein the wire of the first section is made from a first material having a first resistivity and the wire of the second section is made of a material different than the first material and having a resistivity greater than the first resistivity.

17. A method of operating a motor having a main winding and an auxiliary winding having first and second sections adapted for excitation by a power source to effect energization of the motor to a preselected speed therefor; a relay device including contact means movable between open and closed positions and placed in series circuit relation with the second section of the auxiliary winding, and also including coil means excited with the main winding for effecting the actuation of the contact means between its open and closed positions; and a capacitor connected between one side of the relay means and the electrical juncture of the first and second auxiliary winding sections; the method comprising the steps of:

connecting the main winding and both sections of the auxiliary winding across the power source to effect the excitation thereof so as to energize the motor and simultaneously cause current to flow through the coil means of the relay device to effect the actuation of the current means to the closed position thereof; permitting current to flow through the first and second sections of the auxiliary winding thereby to establish a bucking magnetic action of the second winding section relative to the first section; effecting a partial de-excitation of the coil means in response to a reduction in the current draw by the main winding generally as the motor approaches its running speed and causing thereby the movement of the contact means to the open position thereof and interrupting the power supplied to the second section;

continuing the energization of the motor generally at the running speed thereof in response to the excitation of the main winding and the first section of the auxiliary winding while the first winding section draws current through the capacitor.

* * * * *